United States Patent
Dobry et al.

(10) Patent No.: US 8,306,814 B2
(45) Date of Patent: Nov. 6, 2012

(54) METHOD FOR SPEAKER SOURCE CLASSIFICATION

(75) Inventors: Gil Dobry, Moshav Haniel (IL); Hila Lam, Tel-Aviv (IL); Moshe Wasserblat, Maccabim (IL)

(73) Assignee: Nice-Systems Ltd., Ra'anana (IL)

( * ) Notice: Subject to any disclaimer, the term of this patent is extended or adjusted under 35 U.S.C. 154(b) by 371 days.

(21) Appl. No.: 12/777,282

(22) Filed: May 11, 2010

(65) Prior Publication Data

US 2011/0282661 A1  Nov. 17, 2011

(51) Int. Cl.
  *G10L 15/00*  (2006.01)
(52) U.S. Cl. ........ 704/231; 704/246; 704/247; 704/251; 704/252
(58) Field of Classification Search .................. 704/231, 704/246, 247, 251, 252
See application file for complete search history.

(56) References Cited

U.S. PATENT DOCUMENTS

| | | | |
|---|---|---|---|
| 2003/0154072 A1* | 8/2003 | Young et al. | 704/9 |
| 2004/0249650 A1* | 12/2004 | Freedman et al. | 705/1 |
| 2006/0285665 A1* | 12/2006 | Wasserblat et al. | 379/114.14 |
| 2008/0010065 A1* | 1/2008 | Bratt et al. | 704/246 |
| 2008/0154609 A1* | 6/2008 | Wasserblat et al. | 704/273 |
| 2008/0181417 A1* | 7/2008 | Pereg et al. | 381/17 |
| 2010/0070276 A1* | 3/2010 | Wasserblat et al. | 704/243 |

* cited by examiner

*Primary Examiner* — Leonard Saint Cyr
(74) *Attorney, Agent, or Firm* — Soroker-Agmon Advocates and patent Attorneys

(57) ABSTRACT

A method for classifying a pair of audio signals into an agent audio signal and a customer audio signal. One embodiment relates to unsupervised training, in which the training corpus comprises a multiplicity of audio signal pairs, wherein each pair comprises an agent signal and a customer signal, and wherein it is unknown for each signal if it is by the agent or by the customer. Training is based on the agent signals being more similar to one another than the customer signals. An agent cluster and a customer cluster are determined. The input signals are associated with the agent or the customer according to the higher score combination of the input signals and the clusters. Another embodiment relates to supervised training, wherein an agent model is generated, and the input signal that yields higher score against the model is the agent signal, while the other is the customer signal.

11 Claims, 4 Drawing Sheets

METHOD FOR SPEAKER SOURCE CLASSIFICATION

TECHNICAL FIELD

The present disclosure relates to audio analysis in general, and to identifying the speaker in segments of audio interactions, in particular.

BACKGROUND

Large organizations, such as commercial organizations, financial organizations or public safety organizations conduct numerous interactions with customers, users, suppliers or other persons on a daily basis. Many of these interactions are vocal, or at least comprise a vocal component, such as an audio part of a video or face-to-face interaction. A significant part of these interactions takes place between a customer and a representative of the organization such as an agent. Many of the interactions are captured and often recorded.

The interactions convey large volumes of data which may be of high significance to the organization. However, this data is not structured and therefore not easily accessible. Therefore, in order to get insight into the data conveyed by the interactions, audio analysis techniques need to be applied at the audio in order to extract the information.

The interactions and their content can be used for a multiplicity of purposes. One such purpose relates to quality monitoring for assessing the quality of the agent handling the interaction or another entity associated with the call center such as a product, the organization, or the like. Another usage of the interactions relates to analyzing the customer experience, whether the customer is happy with the product or service, threatening to leave, mentioned competitor names, or the like. Automated systems activate multiple tools as part of the analysis. Such tools may include voice recognition tools such as automatic speech recognition or word spotting, emotion analysis tools, call flow analysis, including for example interaction duration, hold time, number of transfers or the like. Different tools may be required for different analyses.

The sides of the interaction, e.g. the agent and the customer may be recorded separately, i.e., on two separate audio signals, in which case it may be known in advance which signal represents the agent and which one represents the customer. In other cases the interactions may be recorded as summed, i.e., the two sides are recorded on one audio signal.

Some of the audio analysis tools are highly dependent on being activated on a single speaker signal. For example, activating an emotion detection tool on a summed audio signal is likely to provide erroneous results. Therefore, in order to activate these tools on summed audio it is required to separate the signal into two signals, each containing speech segments spoken by a single speaker only. Separated signals may contain non-continuous segments of the original interaction, due to speech of the other side, double talk, or the like.

In some embodiments, different analyses may be more relevant to one side of the interaction than to the other. For example, it may be more important to detect emotion on the customer side than on the agent side. However, verifying that compliance words had been said may be a part of quality assurance which is relevant to the agent side.

Therefore, in such situations and when the audio is summed, in addition to separating the audio into two signals, it is also required to identify which signal represents the agent side and which represents the customer side, in order to activate the tools relevant for each side.

There is thus a need for a method for speaker source identification, which will segment a summed audio signal into separate signals if required, and will associate each one-sided audio signal of an interaction with a customer of a call center or with an agent handling the interaction.

SUMMARY

A method for classifying a pair of audio signals captured at a contact center into a signal of a person calling a contact center and a signal of a handling person such as an agent.

A first aspect of the disclosure relates to a method for classification of a first audio signal and a second audio signal into an agent audio signal and a customer audio signal of an interaction, the first audio signal and the second audio signal representing two sides of the interaction, comprising: receiving the first audio signal and the second audio signal, the first audio signal and the second audio signal comprising audio captured by a logging and capturing unit associated with a call center; extracting a first feature vector and a first feature means from the first audio signal and a second feature vector and a second feature means from the second audio signal; adapting a universal background model to the first feature vector and to the second feature vector to obtain a first supervector and a second supervector; combining the first supervector with the first feature means to obtain a first combined vector, and combining the second supervector with the second feature means to obtain a second combined vector; projecting the first combined vector and the second combined vector using a projection matrix obtained in an unsupervised manner, to obtain a first projected vector and a second projected vector; and if the accumulated score of the first projected vector against an agent calls cluster and the second projected vector against an customer calls cluster, is higher than the accumulated score of the first projected vector against the customer calls cluster and the second projected vector against the agent calls cluster, determining that the first audio signal is the agent audio signal and the second audio signal is the customer audio signal, otherwise determining that the first audio signal is the customer audio signal and the second audio signal is agent audio signal. The method can further comprise determining the projection matrix, based on a multiplicity of training signal pairs, each training signal pair comprising an agent signal and a customer signal. Within the method, determining the projection matrix is optionally unsupervised. Within the method, determining the projection matrix optionally includes determining the between-class scatter matrix, based on each of the training signal pairs comprising one customer audio signal and one agent audio signal. The method can further comprise clustering the multiplicity of training signal pairs into a first cluster and a second cluster, and based on two agent signals having more common characteristics with one another than two customer signals, determining whether the first cluster is an agent cluster and the second cluster is a customer cluster, or vice versa. The method can further comprise segmenting a summed audio signal into first speaker segments and second speaker segments, and combining the first speaker segments into the first audio signal, and combining the second speaker segments into the second audio signal. The method can further comprise performing analysis on the first audio signal or on the second audio signal, wherein the analysis depends on whether the first audio signal is an agent audio signal and the second audio signal is a customer audio signal, or vice versa. Within the method, the analysis optionally comprises an item selected from the group consisting of: emotion detection, speech to text, word spotting, text analysis on the resulting text, call flow analysis, root cause analysis, link analysis, topic extraction, categorization, and clustering. The method can further comprise performing quality monitoring on the agent audio signal. Within the method, the first feature vector is optionally a first Mel-frequency cepstral coefficients (MFCC) feature vector; the first feature means is a first MFCC feature means; the second feature vector is a second MFCC feature vector; and the second feature means is a second MFCC feature means.

Another aspect of the disclosure relates to a method for classification of a first audio signal and a second audio signal into an agent audio signal and a customer audio signal of an interaction, the first audio signal and the second audio signal representing two sides of the interaction, comprising: receiving the first audio signal and the second audio signal, the first audio signal and the second audio signal comprising audio captured by a logging and capturing unit associated with a call center; extracting a first feature vector and a first feature means from the first audio signal and a second feature vector and a second feature means from the second audio signal; adapting a universal background model to the first feature vector and to the second feature vector to obtain a first supervector and a second supervector; scoring the first feature vector against an agent model created upon a multiplicity of training agent signals to obtain a first score, and scoring the second feature vector against the agent model to obtain a second score; and if the first score is higher than the second score than the first audio signal is classified as an agent audio and the second audio signal is classified as a customer audio, and vice versa. The method can further comprise determining the agent model, based on a multiplicity of agent audio signals. The method can further comprise segmenting a summed audio signal into a first speaker segments and a second speaker segments, and combining the first speaker segments into the first audio signal, and the second speaker segments into the second audio signal. The method can further comprise performing analysis of the first audio signal or the second audio signal, wherein the analysis depends on whether the first audio signal is an agent audio signal and the second audio signal is a customer audio signal, or vice versa. Within the method, the analysis optionally comprises an item selected from the group consisting of: emotion detection, speech to text, word spotting, text analysis on the resulting text, call flow analysis, root cause analysis, link analysis, topic extraction, categorization, and clustering. The method can further comprise performing quality monitoring on the agent audio signal. Within the method the first feature vector is optionally a first Mel-frequency cepstral coefficients (MFCC) feature vector; the first feature means is a first MFCC feature means; the second feature vector is a second MFCC feature vector; and the second feature means is a second MFCC feature means. Within the method, the model is optionally a Support Vector Machine (SVM) model.

Yet another aspect of the disclosure relates to a computer readable storage medium containing a set of instructions for a general purpose computer, the set of instructions comprising: receiving a first audio signal and a second audio signal representing two sides of the interaction, the first audio signal and the second audio signal comprising audio captured by a logging and capturing unit associated with a call center; extracting a first feature vector and a first feature means from the first audio signal and a second feature vector and a second feature means from the second audio signal; adapting a universal background model to the first feature vector and to the second feature vector to obtain a first supervector and a second supervector; combining the first supervector with the first feature means to obtain a first combined vector, and combining the second supervector with the second feature means to obtain a second combined vector; projecting the first combined vector and the second combined vector using a projection matrix obtained in an unsupervised manner, to obtain a first projected vector and a second projected vector; and if the accumulated score of the first projected vector against an agent calls cluster and the second projected vector against an customer calls cluster, is higher than the accumulated score of the first projected vector against the customer calls cluster and the second projected vector against the agent calls cluster, determining that the first audio signal is the agent audio signal and the second audio signal is the customer audio signal, otherwise determining that the first audio signal is the customer audio signal and the second audio signal is agent audio signal.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
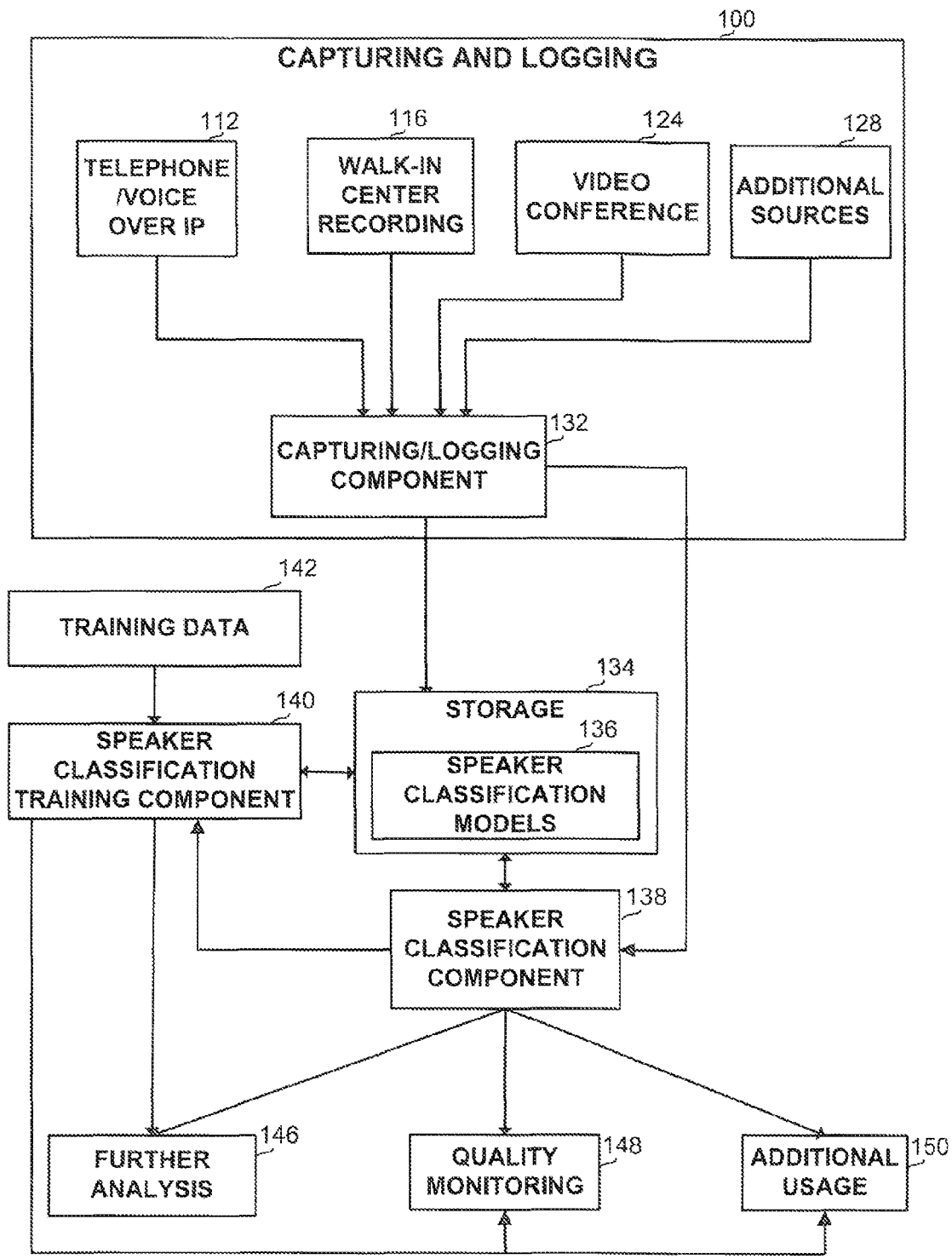
FIG. 1 is a block diagram of the main components in a typical environment in which the disclosed method is used.

This application relates to U.S. patent application Ser. No. 10/567,810, filed on Feb. 9, 2006, incorporated herein by reference in its entirety and for all purposes.

The present invention overcomes the disadvantages of the prior art by providing a novel method for automatically segmenting an audio signal into two or more speakers, and for associating each one-sided audio with a side of the interaction, being either a person external to the organization, such as a customer calling a call center, a trade floor, an emergency service, or the like, or the agent or another representative of the organization handling the call.

The disclosed method generally receives interactions in which exactly one customer and one representative speak.

It is assumed that the agent-side recordings are of similar characteristics among them, since the agents use the same communication channels and uniform or similar equipment. The customer-side recordings, however, are of greater variance, since customers use varied equipments and communication channels, including but not limited to cellular phones, landlines, voice over IP (VoIP) phones or others. It is further assumed that a multiplicity of unlabeled recordings is available, i.e., a multiplicity of recorded interactions in which it may not be a-priori known which is the agent side and which is the customer side of the interaction.

The method utilizes speaker diarization if required, e.g., if some or all the recordings are summed, and speaker source classification which can be implemented using any of at least two embodiments for speaker classification of the one-speaker audio signals.

The first embodiment relates to unsupervised classification, in which a multiplicity of single-channel training audio signals are provided. The audio signals are divided into two clusters, wherein one cluster comprises the audio signals of the agents, and the other cluster contains the audio signals of the customers. The clustering, as well as the determination which cluster contains the agent signals and which contains the customer signals utilizes the understanding that the agent signals have common characteristics due to the identical or similar equipment and environment used.

A second embodiment relates to supervised classification, in which two models are prepared on a training stage, wherein one model represents the agent side of interactions, and the other model represents the customer side. In the supervised classification, it is known for each training signal whether it carries the voice of the agent or the customer. Then, on testing also referred to as runtime, it is determined for each input audio signal, whether it better complies with the agent side or with the customer side.

If the audio file is recorded as summed, it can be diarized or segmented using any technique or algorithm. Some embodiments for segmentation are described in U.S. patent application Ser. No. 10/567,810, filed on Feb. 9, 2006, and hereby incorporated by reference in its entirety.

It will be appreciated that as part of diarizing summed interactions, a score can be provided indicating the certainty of the segmentation, i.e., to what degree the diarization is reliable. If the diarization receives low certainty or is otherwise indicated to fail, the classification of the separated audio to agent and customer can be eliminated. However, audio analysis tools that are less sensitive to multiple speakers, such as word spotting, can still be activated over the summed audio.

It will also be appreciated that internal calls will not be considered and used in the diarization or the classification process. Such calls may contain the voices of two or more agents or other people internal to the organization, with or without the voice of a customer or another person external to the organization. Thus, it cannot be assumed that the audio of the interaction contains the voices of one agent and one customer, which can thus lead to erroneous results.

Referring now to FIG. 1, showing a block diagram of the main components in a typical environment in which the disclosed method is used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, to various encoding and decoding protocols such as G729, G726, G723.1, and the like. The interactions are captured using capturing or logging components 100. The vocal interactions may include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two-sided conversations. The interactions can further include face-to-face interactions, such as those recorded in a walk-in-center 116, video conferences 124 which comprise an audio component, and additional sources of data 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others.

Data from all the above-mentioned sources and others is captured and preferably logged by capturing/logging component 132. Capturing/logging component 132 comprises a computing platform executing one or more computer applications as detailed below. The captured data is optionally stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 134 is storage 136 that stores models, clusters or other data determined via training as detailed below, and used in run-time for audio classification. Storage 134 can comprise a single storage device or a combination of multiple devices. Classification component 138 classifies one-sided audio signals, i.e., indicates whether the audio signal represents the agent speech or the customer speech of an interaction. If the audio is captured as summed, component 138 may also contain a segmentation component for segmenting the audio into two segment groups, one containing segments in which the agent speaks, and the other containing segments in which the customer speaks.

In some embodiments, the classification of audio segments may be assigned a certainty score, indicating a certainty degree of the classification.

The apparatus further comprises classification training component 140 for training models upon training data 142. Training data 142 and classification training component 140 are optionally used for training background models for the supervised classification embodiment, and may also train agent or customer models or clusters for the unsupervised classification embodiment.

The output of classification component 138 and optionally additional data are preferably sent to further analysis component 146 performing further analysis on the classified audio, which may include but is not limited to emotion detection, speech to text, word spotting, text analysis on the resulting text, call flow analysis, root cause analysis, link analysis, topic extraction, categorization, clustering, or the like. The further analysis can depend on the classification results, i.e., different types of analysis may be performed on the agent side and on the customer side.

If the classification score assigned by classification component 138 is low, the audio signals may undergo processing which does not assume a particular side of the interaction. Also, if diarization was performed as part of the classification and the diarization was unsuccessful or was assigned low score, then the analysis can be performed on the summed signal or be limited to analyses types whose performance does not degrade significantly when operated on a two-sided audio.

The output of classification component 138 can also be transferred to or analyzed by a quality monitoring component 148, for monitoring the performance of an agent, an agent group, interactions belonging to a particular category, or the like. The results are optionally transferred also to additional usage components 150, if required. Such components may include playback components, report generation components, alert generation components, or others. The speaker classification results can be further fed back and used for updating the models generated by speaker classification training component 140. The results can also be presented in any way the user prefers, including for example various graphic representations, textual presentation, table presentation, vocal representation, or the like, and can be transferred in any required method, including showing on a display device, sending a report, or others. The output can also be presented as a dedicated user interface that provides the ability to examine and listen to certain areas of the interactions.

The apparatus may comprise one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and method can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
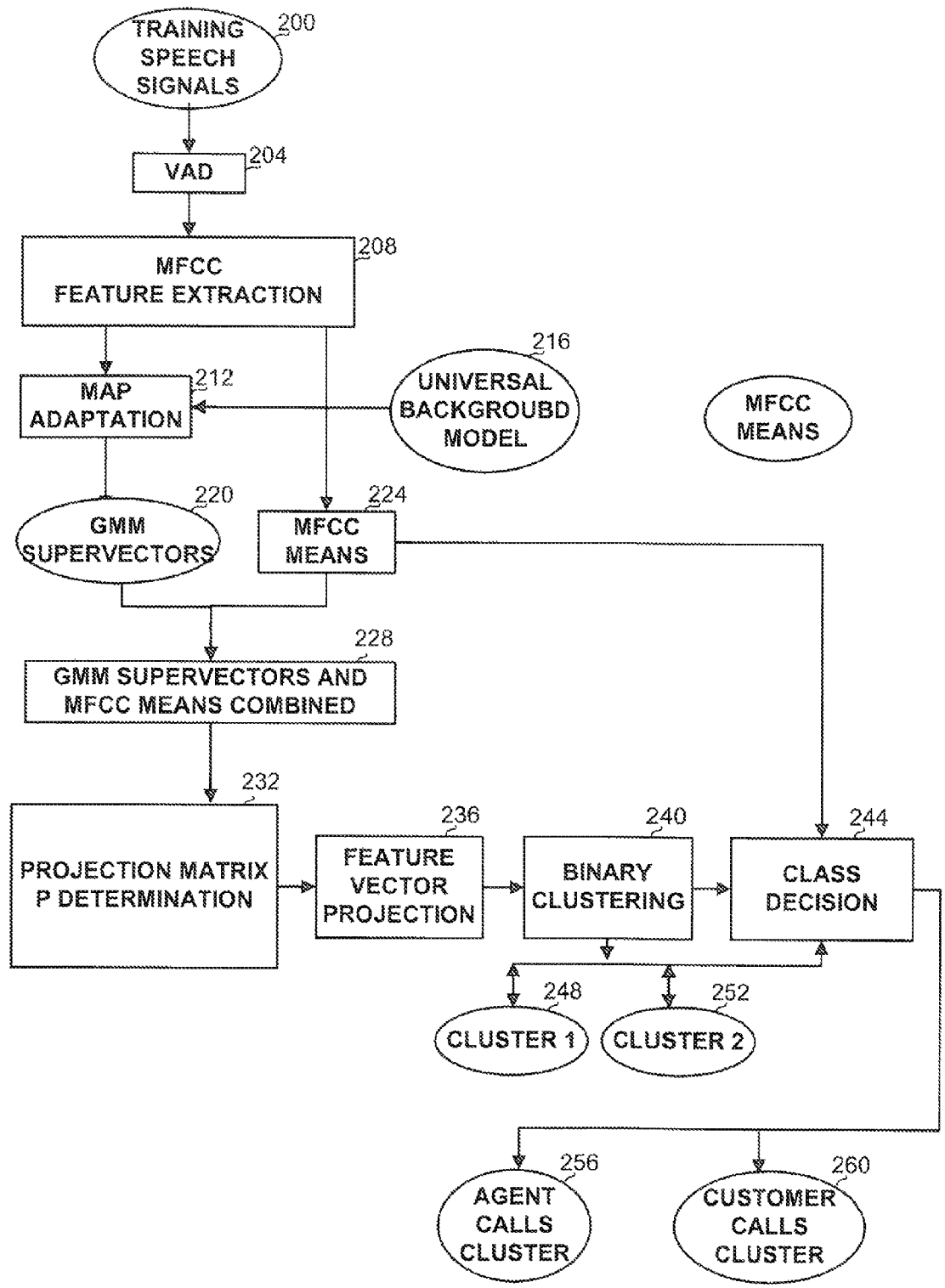
FIG. 2 is a flowchart of the main steps in an embodiment of a method for unsupervised model training for speaker source classification, in accordance with the disclosure.

Referring now to FIG. 2 showing a flowchart of the main steps in an embodiment of the method for unsupervised model training for speaker source classification.

Training speech signals 200 comprise a collection of pairs of audio signals, wherein each pair consists of an audio signal of the agent side of an interaction captured in a call center, and an audio signal of the customer side of the same or another interaction. The audio signals do not necessarily carry all audio of a particular side to an interaction but can comprise only some segments thereof rather than the full audio. Thus, for each pair of signals, while it is known that one represents an agent while the other represents a customer, it is generally not known whether a particular signal represents the agent or the customer.

On VAD step 204 voice activity is detected, and inadequate parts of the audio, such as silent or noisy parts are eliminated, in order to leave only speech parts.

On feature extraction step 208 phonetic features such as Mel-frequency cepstral coefficients (MFCC) are extracted from each audio signal.

Maximum a-posteriori (MAP) adaptation step 212 receives as input a universal background model (UBM) 216 representing speech characteristics of the general population, which was trained using speech from diversified sources. In some embodiments, about several hours of speech collected from multiple speakers in multiple environments are used for training UBM 216. MAP step 212 adapts UBM 216 for each particular input signal from training input signals 300. Thus, MAP adaptation step 212 generates for each input signal an adapted UBM model.

GMM supervectors extraction step 220 extracts vectors, each vector representing one of the models generated on step 212. On MFCC means extraction step 224, the means of the features extracted on MFCC feature extraction step 208, are determined for each input signal.

GMM supervectors extraction step 220 and MFCC means extraction step 224 are combined on step 228 into one vector $A_i$ for each input signal i. On step 232, a projection matrix P is determined. First, a between-class scatter matrix S is determined upon all input pairs, using the information that each pair of input audio signals comprises an agent audio signal and a customer audio signal. The matrix comprises the inter-class variance, i.e., provides the differentiation between the audio pairs, and determines which linear components of the vectors generated on step 228 best distinguish between the sides of the interaction. The scatter matrix S is determined as follows: S=AZ(W)A' wherein A is a matrix whose columns are the training vectors $A_i$ generated on step 228, W is the weight matrix determined as follows: $W_{i,j}=1$ if $A_i$ and $A_j$ are from the same interaction, and 0 otherwise, and Z(W) is the transformation applied to weight matrix W as follows: Z(W)=diag($W_1$)−W, wherein $W_1$ is a vector in which each element is the sum of the elements in the corresponding row of matrix W, and diag($W_1$) is a matrix in which all elements are zero, excluding the elements on the main diagonal which are set to be the elements of vector $W_1$.

Once scatter matrix S is determined, projection matrix P is formed, whose columns are the first m eigenvectors of matrix S, sorted in decreasing order of their corresponding eigenvalues. The number of Eigenvectors used can vary between about 3 and about 30, and can be set for example to about 10. On feature vector projection step 236, the combined or concatenated feature vectors obtained on step 228 are projected using matrix P. The concatenated feature vectors are thus projected to a reduced space where the distance between the customers' vectors and the agents' vectors is relatively higher than it was between the original feature vectors, since P maximizes the following measure:

$$\delta = \sum_{i,j=1}^{n} w_{i,j} \|PA_i - PA_j\|^2$$

On binary clustering step 240 the projected feature vectors are distributed into cluster 1 (248) and cluster 2 (252) of equal sizes. In some embodiments, the distance measure used in the clustering process is the Mahalanobis distance, which is the Euclidian distance normalized by the cluster's covariance matrix. This distance is useful since each cluster has a different distribution, assuming that agents' calls are much more similar to each other than the customers' signals, due to the same equipment and conditions used by the agents.

Under the same assumption, on class decision step 244 the assignment of one of clusters 248 and 252 to the agents and the other to the customer is made using the variance of the MFCC means of the signals associated with each cluster, as extracted on step 224. The MFCC mean value of a recorded session is channel dependent, so it is assumed to vary less among agent calls than among customer calls. The cluster having the smaller MFCC mean variance is then associated with the agents' signals while the other one is associated with the customers' signals. The output of class decision step 244 is thus an agent calls cluster 256 and a customer calls cluster 260.

Figure 3:
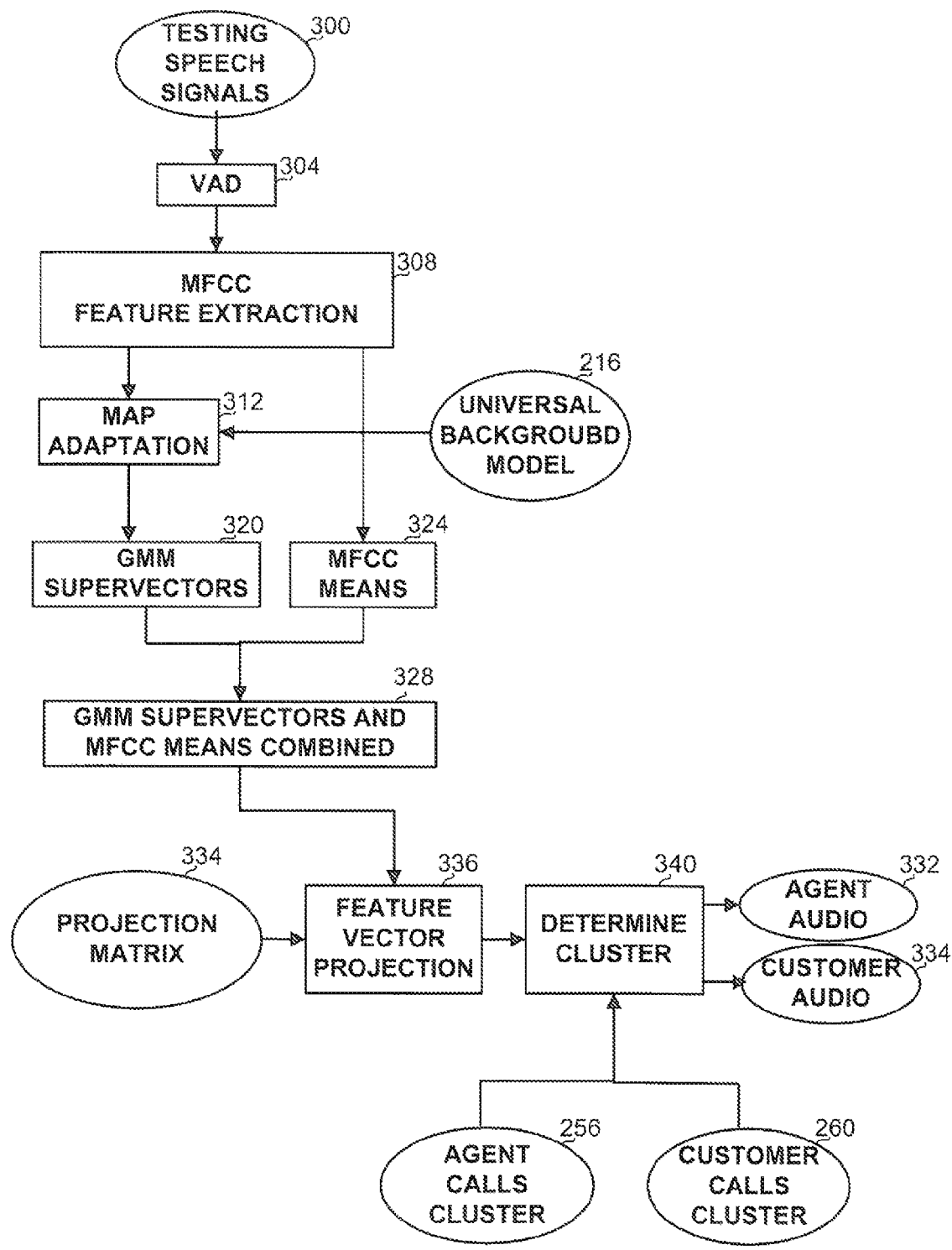
FIG. 3 is a flowchart of the main steps of speaker source classification with unsupervised training, in accordance with the disclosure.

Referring now to FIG. 3, showing a flowchart of the main steps in speaker source classification, in accordance with unsupervised training embodiment as detailed in association with FIG. 2 above.

Testing speech signals 300 comprise a pair of input signals, one represents the agent side of a captured interaction, and the other represents the customer side of an interaction. In some embodiments, the agent and customer side of an interaction as associated, either through PABX or a managerial tool, or because the separate signals were segmented from a summed signal. The input signals undergo voice activity detection step 304, MFCC feature extraction step 308, MAP adaptation step 312, GMM supervector extraction step 320, MFCC means determination step 324 and GMM supervectors and MFCC combination step 328 which are analogous to steps 204, 208, 212, 220, 224 and 228 of FIG. 2. MAP adaptation step 312 uses UBM 216 as detailed in association with FIG. 2 above.

On feature vector projection step 336, the combined vectors created for the two sides of the interaction on step 328 are projected using projection matrix P 334, generated on step 232 of FIG. 2, to obtain two projected vectors in a reduced dimension space, where the linear separability between the two vectors is greater than the separability between the combined vectors.

On step 340, each of the projected vectors is then scored against agent calls cluster 256 and customer calls cluster 260. The combination of one of the projected vectors with one cluster and the other projected vector with the other cluster which yields higher cumulative score then the cross combination is selected, which implies association of one signal with the agent, and the other with the customer, and determining agent audio 332 and customer audio 334.

The embodiment shown on FIGS. 2 and 3 is referred to as unsupervised training, since no information is provided for the training signals, as to which signals are by an agent and which are by a customer.

Figure 4:
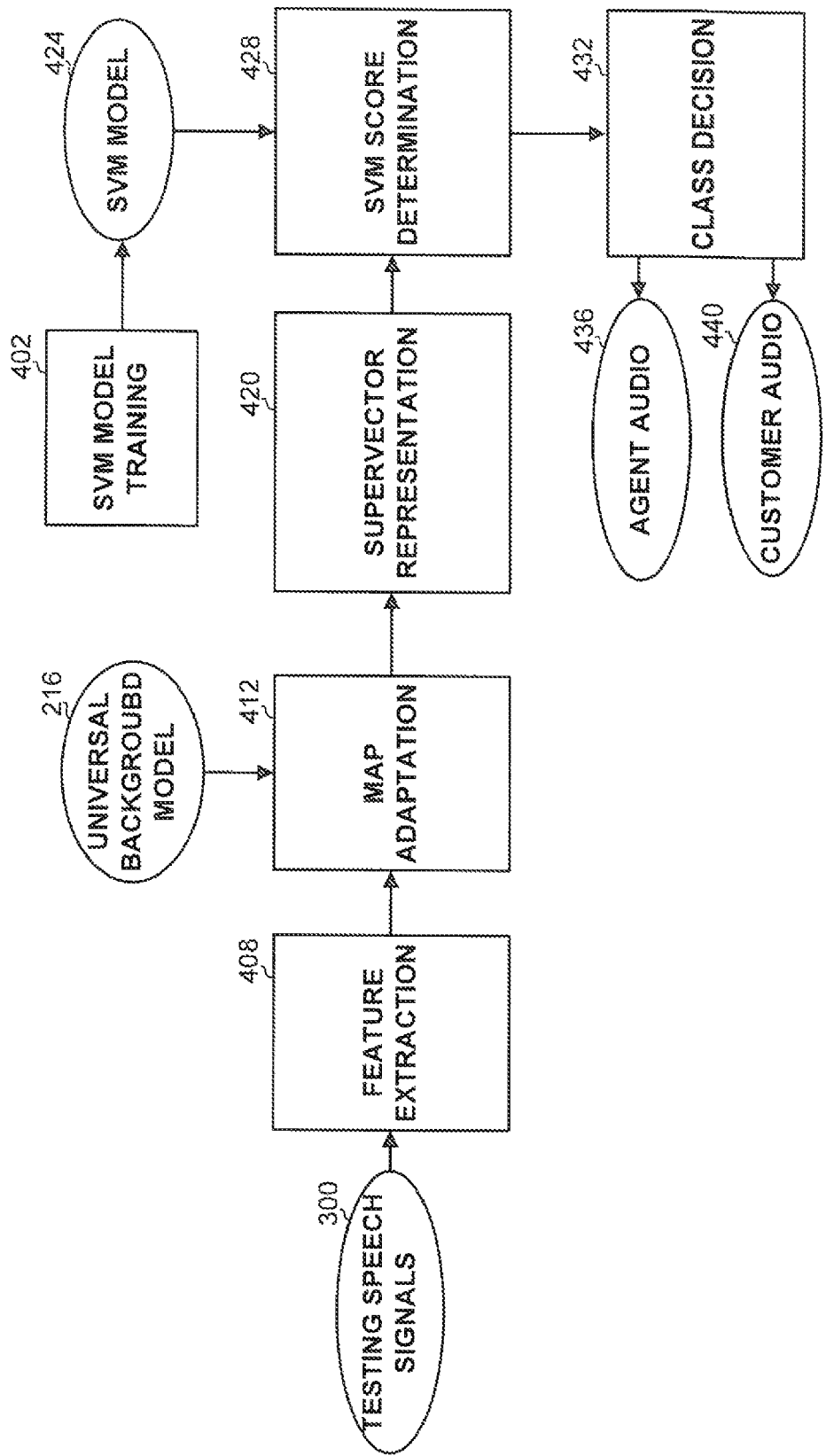
FIG. 4 is a flowchart of the main steps of speaker source classification with supervised training, in accordance with the disclosure.

Referring now to FIG. 4, showing a flowchart of the main steps in speaker source classification, based on supervised training embodiment.

On step 402, an agent model 424 such as Support Vector Machine (SVM) model is created for the agents of the organization, based on a multiplicity of agent audio signals captured in the environment.

Testing speech signals 300 comprise a pair of signals, being an agent audio signal and a customer audio signal, as described in association with FIG. 3 above.

On feature extraction step 408, MFCC features are extracted from the input audio signals. On step 412 MAP adaptation is performed over the feature vectors, using universal background model 216. On supervectors representation step 420 the vectors representing each of the input signals is represented as a supervector. Steps 408, 412 and 420 are analogous to steps 208, 212 and 220 of FIG. 2 above.

On SVM score representation step 428, the supervectors created on step 420 for the agent and for the customer side are scored against model 424. On class decision step 432, the audio signal that received the higher score against model 424 is classified as the agent signal, while the other audio signal is classified as the customer audio signal.

The disclosed embodiments receive unsummed recording-pairs, optionally obtained by unsummed capturing, or created by a speaker diarization engine from two-sided recorded and labeled as agent-side or customer-side interactions. The classification embodiments output a decision for each unsummed recording, whether it represents the agent or the customer.

Each decision is provided with a certainty score, so that low-certainty classifications may be discarded. In some embodiments the certainty score can be obtained from the results of scoring the supervectors representing the audio against the agent and customer call clusters 256 and 260 of FIG. 2 in the unsupervised embodiment, or against model 424 on the supervised embodiment.

The embodiment in which the training is unsupervised is particularly suitable for environments in which unsummed recordings are not labeled, so that no information is available on which audio represents the agent and which represents the customer.

It will be appreciated that although the description sometimes relates to agent and customer, it is applicable to any environment in which people call a contact center, such as a financial organization, a law enforcement organization, a service provide or the like.

It will be appreciated that the disclosed embodiments are particularly suitable for different acoustic conditions and different languages, so that adaptation and deployment to different call centers in different countries do not pose heavy resource requirements.

It will be appreciated that the disclosure covers also an apparatus for carrying out the one or more of the disclosed embodiments. The apparatus can comprise execution units such as executables, static libraries, dynamic libraries, modules, functions, units, services, web services, applications or the like, for performing the various steps.

In some embodiments, the training and testing systems can share common components, such as feature extraction components, MAP adaptation components, or the like. However, there are also components that are used only during training such as a clustering component or between-class scatter matrix determination component, and other components used only during testing such as SVM score determination components.

It will be appreciated that multiple implementations and variations of the method can be designed. Various features and alternatives thereof can be considered and used.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for classification of a first audio signal and a second audio signal into an agent audio signal and a customer audio signal of an interaction, the first audio signal and the second audio signal representing two sides of the interaction, comprising:
    receiving the first audio signal and the second audio signal, the first audio signal and the second audio signal comprising audio captured by a logging and capturing unit associated with a call center;
    extracting a first feature vector and a first feature means from the first audio signal and a second feature vector and a second feature means from the second audio signal;
    adapting a universal background model to the first feature vector and to the second feature vector to obtain a first supervector and a second supervector;
    combining the first supervector with the first feature means to obtain a first combined vector, and combining the second supervector with the second feature means to obtain a second combined vector;
    projecting the first combined vector and the second combined vector using a projection matrix obtained in an unsupervised manner, to obtain a first projected vector and a second projected vector; and
    if the accumulated score of the first projected vector against an agent calls cluster and the second projected vector against an customer calls cluster, is higher than the accumulated score of the first projected vector against the customer calls cluster and the second projected vector against the agent calls cluster, determining that the first audio signal is the agent audio signal and the second audio signal is the customer audio signal, otherwise determining that the first audio signal is the customer audio signal and the second audio signal is agent audio signal.

2. The method of claim 1 further comprising determining the projection matrix, based on a multiplicity of training signal pairs, each training signal pair comprising an agent signal and a customer signal.

3. The method of claim 2 wherein determining the projection matrix is unsupervised.

4. The method of claim 2 wherein determining the projection matrix includes determining the between-class scatter matrix, based on each of the training signal pairs comprising one customer audio signal and one agent audio signal.

5. The method of claim 2 further comprising clustering the multiplicity of training signal pairs into a first cluster and a second cluster, and based on two agent signals having more common characteristics with one another than two customer signals, determining whether the first cluster is an agent cluster and the second cluster is a customer cluster, or vice versa.

6. The method of claim 1 further comprising segmenting a summed audio signal into first speaker segments and second speaker segments, and combining the first speaker segments into the first audio signal, and combining the second speaker segments into the second audio signal.

7. The method of claim 1 further comprising performing analysis on the first audio signal or on the second audio signal, wherein the analysis depends on whether the first audio signal is an agent audio signal and the second audio signal is a customer audio signal, or vice versa.

8. The method of claim 7 wherein the analysis comprises at least one item selected from the group consisting of: emotion detection, speech to text, word spotting, text analysis on the resulting text, call flow analysis, root cause analysis, link analysis, topic extraction, categorization, and clustering.

9. The method of claim 1 further comprising performing quality monitoring on the agent audio signal.

10. The method of claim 1 wherein the first feature vector is a first Mel-frequency cepstral coefficients (MFCC) feature vector; the first feature means is a first MFCC feature means; the second feature vector is a second MFCC feature vector; and the second feature means is a second MFCC feature means.

11. A non-transitory computer readable storage medium containing a set of instructions for a general purpose computer, the set of instructions comprising:
    receiving a first audio signal and a second audio signal representing two sides of the interaction, the first audio signal and the second audio signal comprising audio captured by a logging and capturing unit associated with a call center;
    extracting a first feature vector and a first feature means from the first audio signal and a second feature vector and a second feature means from the second audio signal;
    adapting a universal background model to the first feature vector and to the second feature vector to obtain a first supervector and a second supervector;
    combining the first supervector with the first feature means to obtain a first combined vector, and combining the second supervector with the second feature means to obtain a second combined vector;
    projecting the first combined vector and the second combined vector using a projection matrix obtained in an unsupervised manner, to obtain a first projected vector and a second projected vector; and
    if the accumulated score of the first projected vector against an agent calls cluster and the second projected vector against an customer calls cluster, is higher than the accumulated score of the first projected vector against the customer calls cluster and the second projected vector against the agent calls cluster, determining that the first audio signal is the agent audio signal and the second audio signal is the customer audio signal, otherwise determining that the first audio signal is the customer audio signal and the second audio signal is agent audio signal.

* * * * *